US012076730B2

United States Patent
Nakajo et al.

(10) Patent No.: US 12,076,730 B2
(45) Date of Patent: Sep. 3, 2024

(54) METHOD FOR PRODUCING CARBON MATERIAL DISPERSION, CARBON MATERIAL DISPERSION, AND APPARATUS THEREFOR

(71) Applicant: REFINE HOLDINGS CO., LTD., Gifu (JP)

(72) Inventors: Masaru Nakajo, Tokyo (JP); Mitsuhiro Iwafune, Tokyo (JP); Kensuke Fukasawa, Tokyo (JP); Tomokiyo Takeyama, Tokyo (JP)

(73) Assignee: REFINE HOLDINGS CO., LTD., Gifu (JP)

( * ) Notice: Subject to any disclaimer, the term of this patent is extended or adjusted under 35 U.S.C. 154(b) by 103 days.

(21) Appl. No.: 17/345,373

(22) Filed: Jun. 11, 2021

(65) Prior Publication Data
US 2021/0387205 A1 Dec. 16, 2021

(30) Foreign Application Priority Data
Jun. 12, 2020 (JP) ................................. 2020-102342

(51) Int. Cl.
*B03C 1/02* (2006.01)
*C09C 1/48* (2006.01)

(52) U.S. Cl.
CPC ............... *B03C 1/02* (2013.01); *C09C 1/487* (2013.01); *B03C 2201/20* (2013.01)

(58) Field of Classification Search
CPC .... B03C 1/02; B03C 1/14; B03C 1/16; B03C 1/30; B03C 1/0332; B03C 1/32;
(Continued)

(56) References Cited

U.S. PATENT DOCUMENTS 5,394,991 A * 3/1995 Kumagai ................ B03C 1/247
209/212
6,540,088 B2 * 4/2003 Oder ........................ B03C 7/006
209/128
(Continued)

FOREIGN PATENT DOCUMENTS

JP 2002-370047 A 12/2002
JP 2003-010728 A 1/2003
(Continued)

*Primary Examiner* — Michael McCullough
*Assistant Examiner* — Kalyanavenkateshware Kumar
(74) *Attorney, Agent, or Firm* — Greenblum & Bernstein, P.L.C.

(57) ABSTRACT

The disclosed is a method for producing a carbon material dispersion which removes efficiently and reliably metallic components from carbon materials, and that provides a carbon material dispersion of a high product quality and stable electrical properties. The method comprises a first magnetic separation step in which the powdered and/or granulated carbon material C is applied to the surface of a rotating magnetic roll 130 to remove the metallic component M from the carbon material in the dry state of the powdered and granulated carbon material C; and a second magnetic separation step in which a magnet element 310 is placed in a carbon material dispersion D, in which the carbon material from which the metallic component has been removed in the first magnetic separation step is dispersed in a dispersing medium, in advance of the second magnetic separation step.

11 Claims, 4 Drawing Sheets

(58) Field of Classification Search
CPC ....... B03C 2201/20; C09C 1/487; C09C 1/54; C01P 2004/51
See application file for complete search history.

(56) References Cited

U.S. PATENT DOCUMENTS

| | | | |
|---|---|---|---|
| 7,618,601 B2* | 11/2009 | Rodrigues De Freitas | C22B 34/1204 209/11 |
| 2014/0083948 A1* | 3/2014 | Yang | A61M 1/36 210/695 |
| 2018/0353969 A1* | 12/2018 | Ishida | B03C 1/18 |

FOREIGN PATENT DOCUMENTS

| JP | 2003-123742 A | 4/2003 |
|---|---|---|
| JP | 2004-107095 A | 4/2004 |
| JP | 2005-113091 | 4/2005 |
| JP | 2009-138054 | 6/2009 |
| JP | 2009-138054 A | 6/2009 |
| JP | 4687833 B2 | 5/2011 |
| JP | WO2013/145872 A1 | 10/2013 |
| JP | 2015-065097 | 4/2015 |
| JP | 2015-65097 A | 4/2015 |
| JP | 2015-191756 | 11/2015 |
| JP | 6197725 B2 | 11/2015 |
| JP | 2016-100088 A | 5/2016 |
| JP | 2016-155122 A | 9/2016 |
| JP | WO2017/094803 A1 | 6/2017 |
| JP | 2017-131869 A | 8/2017 |
| JP | 2017-170320 A | 9/2017 |
| JP | 2017-176906 A | 10/2017 |
| JP | 2019-46796 A | 3/2019 |
| JP | 2019-529108 A | 10/2019 |
| WO | WO2017/094039 A1 | 8/2017 |
| WO | WO2019/044716 A1 | 3/2019 |

* cited by examiner

METHOD FOR PRODUCING CARBON MATERIAL DISPERSION, CARBON MATERIAL DISPERSION, AND APPARATUS THEREFOR

CROSS-REFERENCE TO RELATED APPLICATIONS

This application is based on and claims priority to Japanese Patent Application No. 2020-102342 filed on Jun. 12, 2020, which is hereby incorporated by reference as if set forth in its entirety herein.

TECHNICAL FIELD

The present invention relates to a method for producing a carbon material dispersion, a carbon material dispersion, and an apparatus used therefor. In detail, the present invention relates to a technology for efficiently removing metallic components as impurities in obtaining a dispersion of a carbon material such as carbon black, graphite, carbon nanotubes, etc. dispersed in a dispersing medium, and for producing a carbon material dispersion having excellent characteristics.

BACKGROUND ART

Conventionally, carbon materials such as carbon black, graphite, carbon nanotubes, carbon nanofibers, carbon fibers, and fullerene have been used as black pigment, black filler, light shielding material, and conductive material in a wide range of fields such as toners, printing inks, inkjet inks, writing inks, paints, rubber compositions, plastic compositions, or electrode forming materials and conductive layer forming materials in the battery and semiconductor fields.

Taking carbon black as an example among the carbon materials mentioned above, carbon black can be classified into three types: (a) furnace black obtained by the furnace method, in which oil or gas is incompletely burned in high-temperature gas to obtain carbon black; (b) channel black obtained by the channel method, in which natural gas is burned and deposited on a channel steel, which is then scraped up; (c) acetylene black obtained by the acetylene method, in which acetylene gas is thermally decomposed to obtain carbon black; and (d) thermal black obtained by the thermal method, which produces carbon black by repeatedly burning and decomposing gas in a furnace with heat storage. The raw materials for these carbon blacks include metallic components such as Fe and Cu. These metallic components are concentrated during the carbon black producing process, and another metallic components are also able to get mixed in the carbon black from cooling water and producing facilities, resulting in carbon black containing various metallic components.

Therefore, in applications such as batteries and semiconductors, where contamination by metallic components is extremely unacceptable, it is necessary to remove those metallic components and make the carbon material highly pure.

Incidentally, in recent years, solid electrolytes with high lithium ion conductivity have been developed. In lithium secondary batteries using the solid electrolytes, the internal resistance of the battery can be reduced because the charge transfer resistivity between the solid electrolyte and metallic lithium is much smaller than that of lithium secondary batteries using organic electrolyte. In producing such all-solid electrolyte lithium secondary batteries, the carbon material is used as a conductive auxiliary agent for forming electrode in the form of a carbon material dispersion dispersed in a dispersing medium. In all-solid electrolyte lithium-ion secondary battery applications, it is desirable to remove metallic components as much as possible, since the presence of metallic components has a significant bad influence on battery characteristics.

Not only in such all-solid electrolyte lithium-ion secondary batteries, but also in lithium-ion secondary batteries, the presence of metallic foreign contamination in the carbon material, which is the conductive auxiliary agent for forming electrode, is a cause of dendritic lithium metal deposits, which can lead to internal short circuit. Therefore, the removal of the metallic foreign contamination is desirable for the lithium-ion batteries in general.

As methods of removing metallic components from carbon material dispersions, in the prior arts, for example, a method wherein an aqueous dispersion of carbon black is brought into contact with a variety of water-soluble chelating agents, in order to elute the metallic components contained in the carbon black, to capture them by the chelating agents, and to transfer them to the liquid phase, which is followed by solid-liquid separation (Patent Literature 1), and a method which includes a step wherein an aqueous dispersion of carbon black is brought into contact with a cation exchange resin (Patent Literature 2), have been proposed. In addition, although not targeting carbon materials, a method of removing magnetic materials from a slurry containing non-conductive particles by placing a magnet such as a magnetic filter in the flow of the slurry (Patent Literature 3) has been proposed. In addition, a method which comprises a dispersion step of bringing a slurry composition for a rechargeable battery containing carbon particles of a predetermined particle size range, a particulate binder and a dispersing medium into a predetermined viscosity condition; and a removing step of removing particulate metallic components containing at least one metal selected from the group consisting of Fe, Ni, and Cr in the slurry composition for a rechargeable battery that has been dispersed by the dispersion step by a magnet provided with a magnet cover of a Vickers hardness of not less than 10 GPa and less than 25 GPa (Patent Literature 4).

However, none of the previously known methods for removing metallic components as shown in Patent Literatures 1-4, have reached the point where they are sufficiently effective.

Furthermore, the chemical removal method using a chelating agent, as shown in Patent Literature 1, requires an additional treatment step to separate the added chelating agent from the carbon black, which makes the process complicated and costly to manufacture. In addition, the dispersing system in which the chelating agent can be added is practically limited to aqueous systems, and it is not suitable for processing non-aqueous dispersions for solid electrolyte lithium secondary batteries, which do not like the presence of moisture.

Even in the case of using an ion-exchange resin as shown in Patent Literature 2, a further treatment step is required to separate the added ion-exchange resin from the carbon black, which makes the process more complicated. In addition, since the ion exchange resin is in the form of particles, there is a fear that the amount of carbon black removed from the system along with the ion exchange resin to be removed will increase, and the yield will become low.

In the methods shown in Patent Literatures 3 and 4, it is proposed that after preparing a carbon material slurry of a predetermined viscosity, a magnetic filter consisting of magnets arranged in a lattice or slit configuration is placed in the flow path for the slurry and the slurry is passed through the filter to remove metallic components. However, it is difficult to remove the metallic components efficiently because the metallic components (magnetic materials) included in the slurry containing the carbon material cannot sufficiently attach themselves to the magnets even if they are placed in a magnetic field of the magnets since they cannot come close to the magnets against the flow of the slurry, or even if they does attach themselves to the magnets, they are separated from the magnets again by collision with carbon material particles in the subsequent flow of the slurry. Therefore, it was difficult to remove metallic components efficiently. Some of the metallic components mixed in the carbon material exist as metallic particles independent of the carbon material powder particles, but many of them are contained in the carbon material powder particles. In particular, in respect of the latter metallic components contained in the carbon material powder particles, since the movement of the carbon material powder particles per se is restricted in the dispersing medium, even if the magnetic attraction is performed under wet conditions, some of the metallic components may remain in the slurry without being captured by the magnet, and thus the metallic components may not be removed efficiently.

PRIOR ART DOCUMENT

Patent Literature

Patent Literature 1: JP 2005-113091 A
Patent Literature 2: JP 2009-138054 A
Patent Literature 3: JP 2015-065097 A
Patent Literature 4: JP 2015-191756 A

SUMMARY OF THE INVENTION

Problem to be Solved by the Invention

Therefore, the present invention aims to provide a method for producing a carbon material dispersion that can efficiently and reliably remove metallic components from carbon materials, and can demonstrate extremely high product quality and stable electrical characteristics, as well as a carbon material dispersion obtained thereby and an apparatus used therefor. The present invention also aims to provide a method for producing carbon material dispersion that can efficiently separate metallic components from carbon materials and obtain high-quality carbon material dispersion at low cost without the need for complicated processes or waste liquid treatment, as well as the carbon material dispersion obtained thereby and the apparatus used therefor. The present invention further aims to provide a method for producing a carbon material dispersion suitable as a conductive auxiliary agent dispersion for producing a lithium-ion secondary battery, a carbon material dispersion obtained thereby, and an apparatus used therefor.

Means for Solving the Problem

In order to solve the above problem, we, the inventors, have conducted intensive studies and investigations, and as a result, we have developed a process in which, in the dry state of the carbon material in powdered and/or granulated form, the powdered and/or granulated form of the carbon material is applied to the surface of a rotating magnetic roll to remove a metallic component from the carbon material, and then the carbon material from which the metallic component has been thus removed is dispersed into a dispersing medium in order to prepare a carbon material dispersion, and thereafter, in the wet state a magnet is placed in the carbon material dispersion in order to the metallic component still remained in the carbon material dispersion is removed from the dispersion. Thereby, we have found that it is possible to remove metallic components efficiently and to obtain a purified carbon material dispersion with high yield by simple operation, which led us to the present invention.

Namely, the present invention provides a technology to embody a method for producing carbon material dispersion which solves the above-mentioned problem, the method comprises:

a first magnetic separation step in which, in a dry state in which the carbon material is in a powdered and/or granulated form, the powdered and/or granulated form of the carbon material is applied on a surface of a rotating magnetic roll to remove a metallic component from the carbon material, and a second magnetic separation step in which a magnet element is placed in a carbon material dispersion in order to remove the metallic component from the carbon material dispersion, wherein the carbon material dispersion is prepared by dispersing the carbon material from which the metallic component has been removed in the first magnetic separation step in a dispersing medium, in advance of the second magnetic separation step.

In an embodiment of the method for producing carbon material dispersion according to the present invention, the magnetic roll used in the first magnetic separation step may rotate in a forward direction with a conveying direction of the carbon material in powdered and/or granulated form.

In an embodiment of the method for producing carbon material dispersion according to the present invention, the magnetic roll used in the first magnetic separation step may have a magnet element of 5000 to 20000 gauss that is magnetized in a radial direction of the magnetic roll, and the magnet element used in the second magnetic separation step may be a magnet element of 5000 to 20000 gauss that is arranged in a flow path of the carbon material dispersion approximately along an axial direction of the flow path.

In an embodiment of the method for producing carbon material dispersion according to the present invention, the viscosity of the carbon material dispersion subjected to the second magnetic separation step may be in a range of 10 to 1000 mPa's.

In one embodiment of the method for producing a carbon material dispersion according to the present invention, the dispersing medium may be an organic solvent.

Further, the present invention provides a technology to embody a carbon material dispersion which solves the above-mentioned problem, the carbon material dispersion comprises a carbon material and a dispersing medium dispersing the carbon material, wherein the content of the carbon material in the dispersing medium is in a range of 10-25% by mass based on the total mass of the carbon material dispersion, and the mass fraction of the magnetic metallic component to the carbon material is not more than $1 \times 10^{-7}$.

In one embodiment of the carbon material dispersion according to the present invention, the carbon material dispersion may be the one obtained through the first and second magnetic separation steps described above.

Still further, the present invention provides a technology to embody a carbon material dry refining apparatus which solves the above-mentioned problem, the apparatus comprises:
- a magnetic roll which comprises a rotating hollow cylindrical element and a magnet element, wherein a surface of the rotating hollow cylindrical element comprises a contact surface with a carbon material, the magnet element comprises an arc-shaped magnetized facing surface arranged in close proximity to the inner surface of the hollow cylindrical element in the inner space of the hollow cylindrical element;
- a supply path which is located upstream of the rotating hollow cylindrical element of the magnetic roll, and which supplies the carbon material in powdered and/or granulated form; and
- a recovery section which is located downstream of the rotating hollow cylindrical element of the magnetic roll, and which collects the carbon material in powdered and/or granulated form which falls down without attaching itself to the surface of the hollow cylindrical element.

In one embodiment of the carbon material dry refining apparatus according to the present invention, the supply path may comprise a belt conveyor section which has a terminal portion near a topmost position of the magnetic roll and which conveys the carbon material in powdered and/or granulated form in an approximately tangential direction to the magnetic roll.

In one embodiment of the carbon material dry refining apparatus according to the present invention, the apparatus may further comprise a regulator which regulates an amount of the carbon material in powdered and/or granulated form fed to the hollow cylindrical element of the magnetic roll in order to feed the carbon material conveyed on the belt conveyor section as a layer of predetermined thickness or less.

In one embodiment of the carbon material dry refining apparatus according to the present invention, the arc-shaped magnetized facing surface of the magnet element may have an angular range of 90° to 270°.

In one embodiment of the carbon material dry refining apparatus according to the present invention, the arc-shaped magnetized facing surface of the magnet element may start at a position of −20° to 30° in the forward direction of rotation of the hollow cylindrical element and does not exist at a position of at least 275° to 315°, on an assumption that a topmost position of the magnetic roll is set to 0°.

In one embodiment of the carbon material dry refining apparatus according to the present invention, the magnet element may be of 5000 to 20000 gauss and magnetized in a radial direction of the magnetic roll.

Furthermore, the present invention provides a technology to embody a carbon material refining system which solves the above-mentioned problem, the refining system comprises:
- an upstream-side dry refining apparatus which comprises a magnetic roll and a recovery section which comprises a rotating hollow cylindrical element and a magnet element, wherein a surface of the rotating hollow cylindrical element comprises a contact surface with a carbon material, the magnet element comprises an arc-shaped magnetized facing surface arranged in close proximity to an inner surface of the hollow cylindrical element in an inner space of the hollow cylindrical element, wherein the recovery section located downstream of the rotating hollow cylindrical element of the magnetic roll, and the section collects the carbon material in powdered and/or granulated form which falls down without attaching itself to the surface of the hollow cylindrical element; and
- a downstream-side wet refining apparatus which a magnetic filter, wherein the magnetic filter comprises a magnet element arranged in a flow path of a carbon material dispersion approximately along an axial direction of the flow path, and a liquid flow passage in contact with a surface of the magnet element or a magnetic surface applied by a magnetic field of the magnet element, wherein the carbon material dispersion passes through the liquid flow passage, with a proviso that the carbon material dispersion is prepared by dispersing the carbon material in powdered and/or granulated form, which has been applied to the dry refining apparatus and collected in the recovery section of the dry refining apparatus, in a dispersing medium.

Effect of the Invention

According to the present invention, a high-quality carbon material dispersion that have been purified by extreme removal of metallic components can be obtained, and thus, for example, when the carbon material dispersion is used as a conductive auxiliary material for electrode formation in secondary batteries, it is possible to produce stable secondary batteries of high quality.

In addition, the presence of particulate metallic components in the battery causes problems such as internal short-circuits and increased self-discharge due to dissolution and deposition during charging, but the use of the carbon material dispersion according to the present invention eliminates these problems and improves the cycle characteristics and safety of the battery.

EMBODIMENTS FOR CARRYING OUT THE INVENTION

Now, the present invention will be described in detail, based on embodiments.

<Method for Producing Carbon Material Dispersion>.

The method for producing a carbon material dispersion according to the first aspect of the present invention comprises: a first magnetic separation step in which, in a dry state in which the carbon material is in a powdered and/or granulated form, the powdered and/or granulated form of the carbon material is applied on a surface of a rotating magnetic roll to remove a metallic component from the carbon material; and a second magnetic separation step in which a magnet element is placed in a carbon material dispersion in order to remove the metallic component from the carbon material dispersion, wherein the carbon material dispersion is prepared by dispersing the carbon material from which the metallic component has been removed in the first magnetic separation step in a dispersing medium, in advance of the second magnetic separation step.

Figure 1:
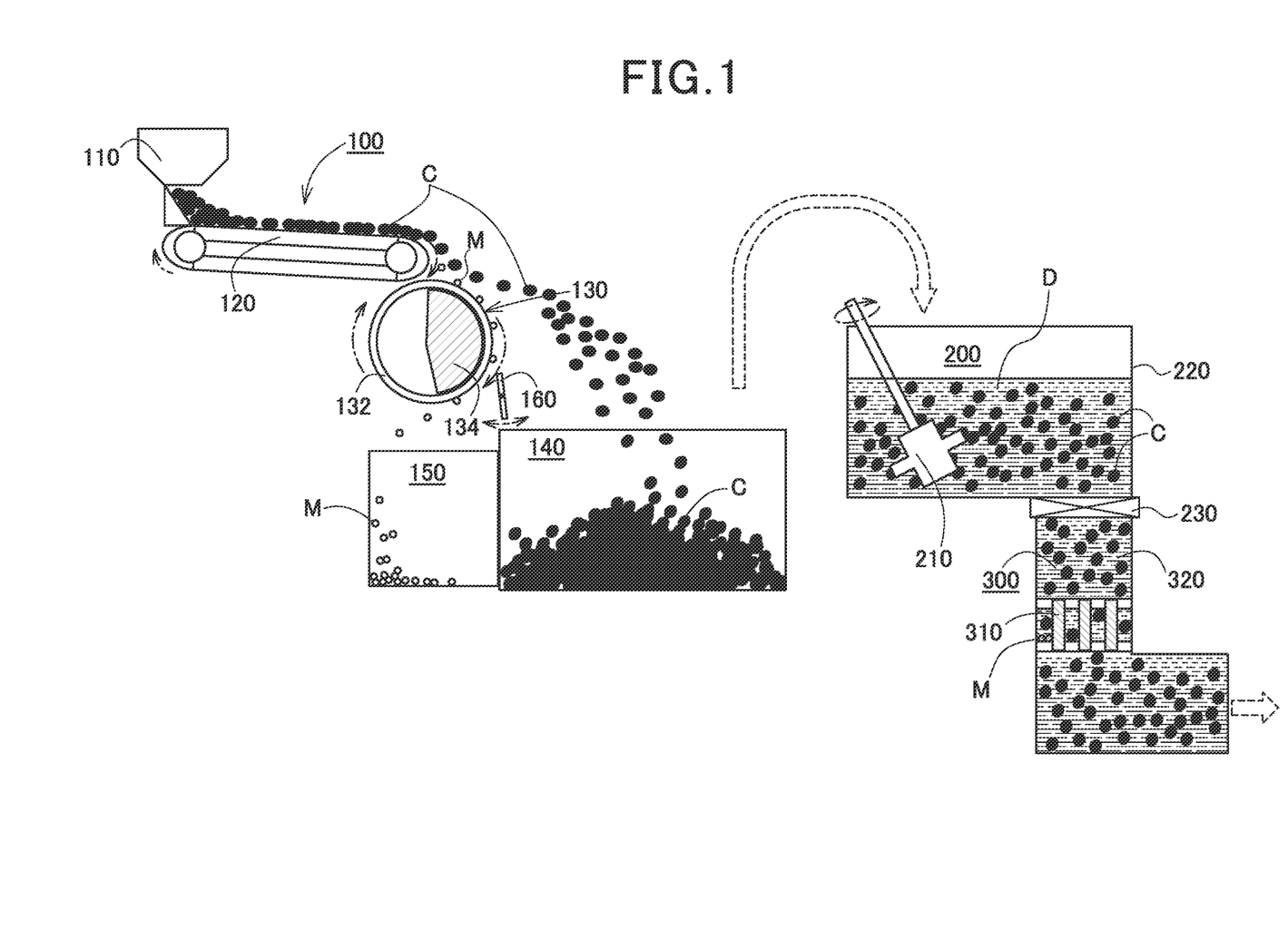
FIG. 1 is a block diagram showing the overall configuration of one embodiment of the carbon material refining system according to the present invention.

FIG. 1 is a block diagram schematically showing the overall structure of one embodiment of a carbon material refining system used in implementing the method for producing carbon material dispersion according to the first aspect of the present invention. FIGS. 2, 3A and 3B, and 4A and 4B are sectional views schematically showing the structure of another embodiment of the dry refining apparatus in the same refining system, respectively. In FIGS. 1 to 4, the sizes and dimensions of materials and components, such as carbon material powder and/or granule, and metal particles, are exaggerated in order to facilitate visual understanding, and it should be understood that the present invention is not limited to the described embodiments, particularly, the contents of drawings in this respect.

First, the outline of the method for producing carbon material dispersion according to the first aspect of the invention, will be briefly explained with taking as an example the case where the method is implemented using one embodiment of this purification system.

One embodiment of the refining system shown in FIG. 1 comprises an upstream-side dry refining apparatus 100 and a downstream-side wet refining apparatus 300, wherein a first magnetic separation step is performed to remove metallic components M from the carbon material C by applying the carbon material powder and/or granule on the surface of a rotating magnetic roll 130 in a dry state in which the carbon material C is in a powdered and granulated form. The carbon material C sorted in the first separation step is then mixed with a dispersing medium in a dispersion preparation apparatus 200 to prepare a carbon material dispersion D. The prepared carbon material dispersion D is introduced into a wet refining apparatus 300, and a magnet 310 is placed in the flow of the carbon material dispersion D, thus, the second magnetic separation step is carried out to remove the metallic component M from the carbon material dispersion D by placing a magnet 310 in the flow of the carbon material dispersion D.

In the method for producing a carbon material dispersion in accordance with the first aspect of the present invention, the carbon material C to be treated is not particularly limited as long as it can have an electrical conductivity, and can be presented in a powdered or granulated form. For instance, graphite, carbon black (CB), carbon nanotubes (CNT), carbon nanofiber (CNF), carbon fiber (CF), fullerene, natural graphite, etc., may be used singly or in combination with two or more materials. As the carbon material, CB is particularly preferred. Furthermore, as the CB, for example, furnace black, channel black, acetylene black, thermal black, etc., are involved, any of which can be used. Among them, the acetylene black has an inherently low metallic component content due to its producing process. But, by undergoing the producing method for carbon material dispersion of the present invention, the resulting acetylene black dispersion can have an even greater reduction in the metallic component content.

Herein, the "powdered and/or granulated" form of the carbon material is not particularly limited if it is at least large enough to be applied to the magnetic roll of the first magnetic separation step when removing mixed metallic components. For example, it can include primary particles with an average particle diameter of about 10 to about 60 nm, secondary particles with an average particle diameter of about 1 to about 1,000 μm due to agglomeration of such primary particles or something like that, or processed particles with an average particle diameter of about 0.5 to about 5 mm by compression or granulation treatment, etc. In addition, the shape of the particles is not limited to a roughly spherical shape, but can also include an oval shape, flakes, needles or short fibers, irregular shapes, etc. In the first magnetic separation step, which will be described later, the average particle diameter of the carbon material is desirable to be in the range of not less than 0.5 mm and not more to 5 mm, because more efficient removal of metallic components would be expected. In the second magnetic separation step, it is desirable that the average particle diameter of the carbon material is not more than about 10 μm in the carbon material dispersion.

The "average particle size" used herein means the average particle size d50 (so-called median diameter) on a volume basis, as measured using a laser diffraction scattering particle size analyzer.

(First Magnetic Separation Step)

In the producing method of the carbon material dispersion according to the first aspect of the present invention, as the first magnetic separation step, in the dry state where the carbon material C is in the form of powdered and/or granulated, the powder and/or granule of said carbon material C are applied on the rotating magnetic roll surface 130.

The carbon material is said to be in a "dry state" as long as the individual particles of the carbon material are able to move with free fluidity in the gas phase. Although it is not particular limited, the carbon material in the dry state is basically free of volatile components such as water or solvents, or contains only a small amount of such components, e.g., less than 0.05% of the total mass.

When the carbon material C is applied to the surface of the rotating magnetic roll 130 in the dry powdery state, the particles of the carbon material pass over the surface of the magnetic roll or the space in the vicinity of the surface of the magnetic roll at least temporarily in a plane-like or thin layer-like streaming behavior. The particles of magnetic metal components such as iron and stainless steel that were mixed in the carbon material C powder and/or granule, and particles of carbon material powder and/or granule that incorporated such magnetic metal component therein, are attracted and captured by the magnetic force on the surface of the magnetic roll very efficiently. On the other hand, particles of carbon material powder and/or granule (which do not contain metallic components) are sorted by falling with a trajectory that is separated from the magnetic roll because they are diamagnetic. Since a rotating magnetic roll is used, the first magnetic separation step can be a continuous process.

In one embodiment of the refining system shown in FIG. 1, the carbon material recovery section 140 and the metallic component recovery section 150 are compartmentalized and arranged in the lower position of the magnetic roll 130. The carbon material particles that do not attach to the surface of the rotating hollow cylindrical element 132 of the magnetic roll 130, but are repelled by the magnetic field of the magnetic roll 130 and fall forward away from the magnetic roll, are collected in the carbon material recovery section 140, while the metallic component particles that are once attracted and captured by the magnetic force of the magnet element 134 on the surface of the hollow cylindrical element 132 are collected in the metallic component recovery section 150. On the other hand, metallic components M that are once attracted and trapped by the magnetic force of the magnet element 134 on the surface of the hollow cylinder 132, and then carried by the rotation of the hollow cylinder 132 to an angle where the magnetic force of the magnet element 134 does not reach, and then detached from the hollow cylinder 132 and fall, are collected in the metallic component recovery section 150.

Incidentally, for example, in such a dry magnetic separation step, if a lattice-shaped magnet element or the like is used instead of the magnetic roll of the present invention to capture metallic components by arranging such a magnet element on the flow path of carbon material powder and/or granule, the carbon material powder and/or granule pass through the magnet element with a three-dimensional spread. Thus, it cannot capture the metallic components as efficiently as in the case of the magnetic roll used according to the present invention.

Figure 2:
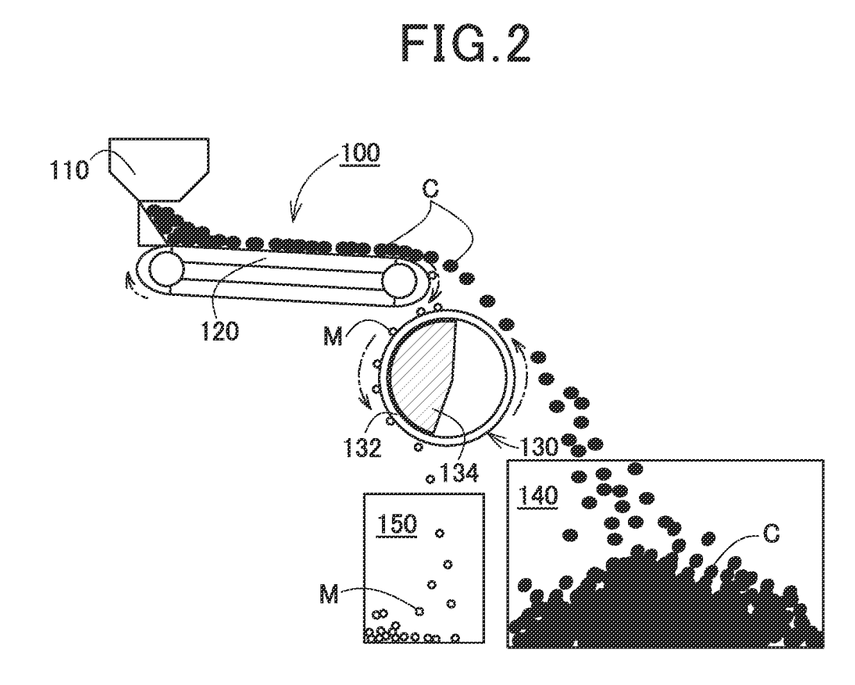
FIG. 2 is a schematic sectional view showing the configuration of another embodiment of the carbon material dry refining apparatus according to the present invention.
Figure 3A:
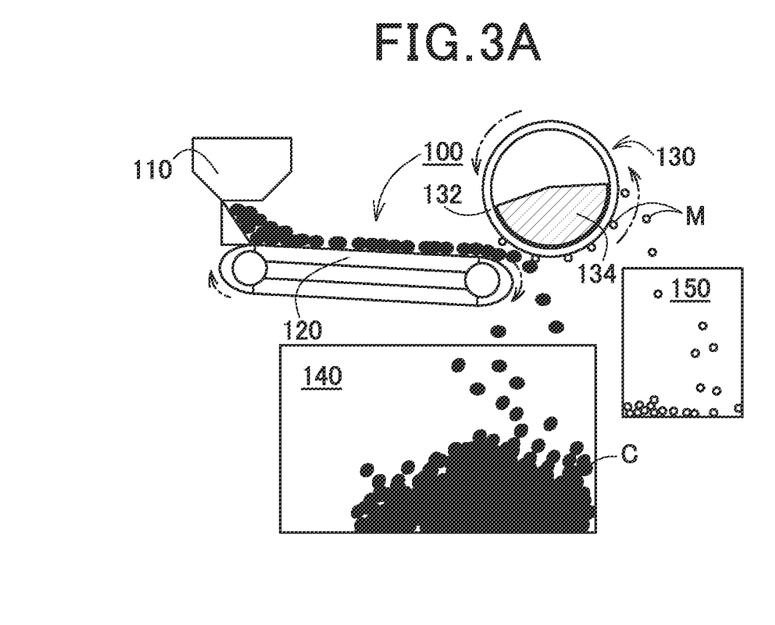
FIGS. 3A and 3B are schematic sectional views showing the configuration of other embodiments of the carbon material dry refining apparatus according to the present invention, respectively.
Figure 3B:
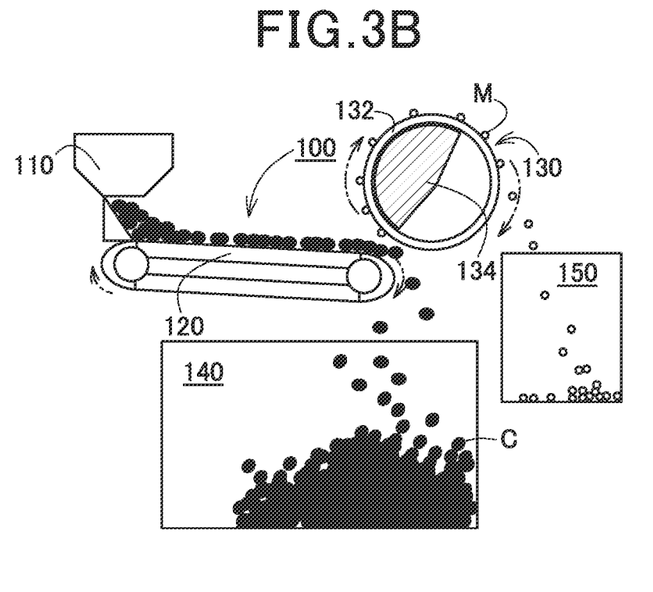
Figure 4A:
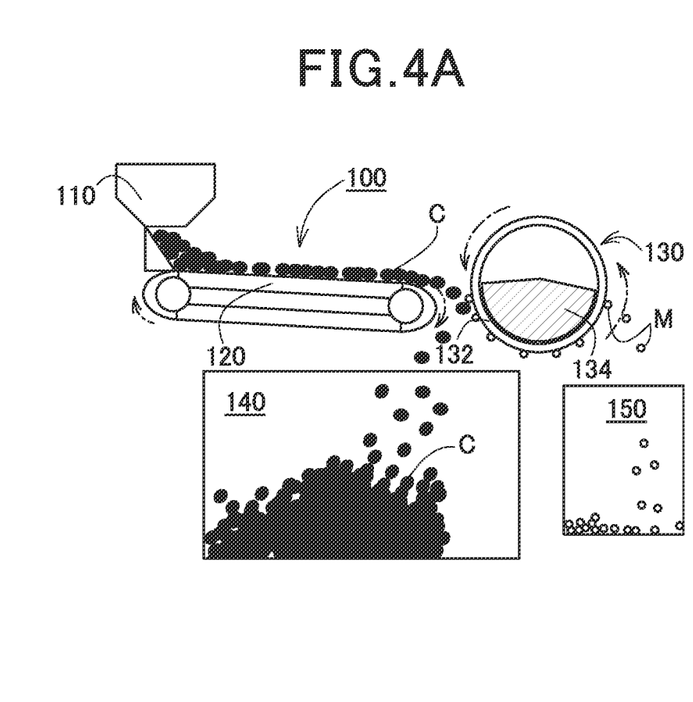
FIGS. 4A and 4B are schematic sectional views showing the configuration of yet other embodiments of the carbon material dry refining apparatus according to the present invention, respectively.
Figure 4B:
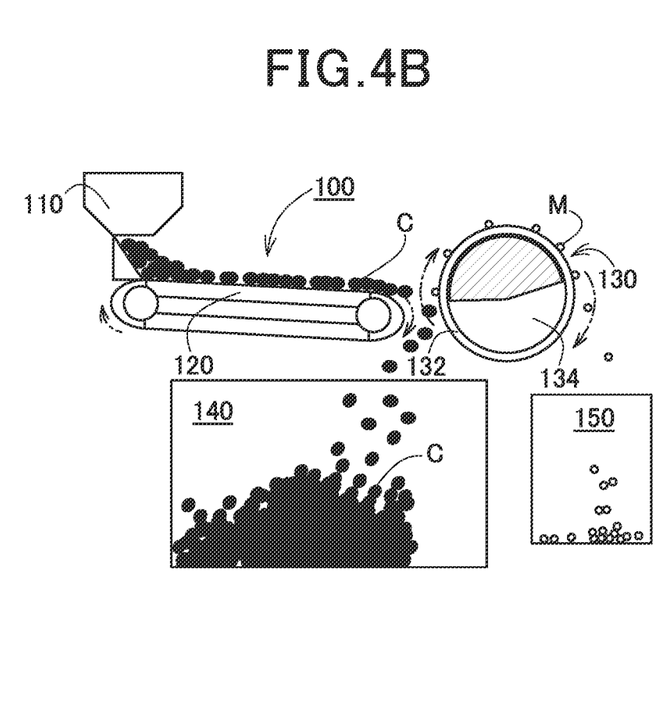

As for the direction of rotation of the magnetic roll, it is possible to use magnetic roll 130 that rotates in the forward direction with the conveying direction of the carbon material as shown in FIG. 1, FIG. 3A, and FIG. 4A, or rotates in the reverse direction with the conveying direction as shown in FIG. 2, FIG. 3B, and FIG. 4B. However, considering the collection efficiency of the sorted carbon materials flowing with a trajectory that is separated from the magnetic roll, it is desirable to use magnetic roll that rotates in the forward direction with the conveying direction.

In addition, in this first magnetic separation step, the feeding position where the powdered and/or granulated carbon material C is fed to the magnetic roll 130 is not particularly limited, although it is affected to some extent by the direction of rotation of the magnetic roll. For example, the position can be near the topmost position of the magnetic roll 130 as shown in FIGS. 1 and 2, near the bottommost position of the magnetic roll 130 as shown in FIGS. 3A and 3B, or at any intermediate position between the top and bottom of the magnetic roll 130 as shown in FIGS. 4A and 4B. Among these, it is desirable to set the position near the topmost position of the magnetic roll 130 as shown in FIG. 1 in order to make relations between any two among the supplying direction of the carbon material C, the flow of the carbon material C sorted by the magnetic roll, and the separated metallic component M better without interfering with each other.

In addition, in order to improve the magnetic sorting efficiency in the first magnetic separation step, it is desirable that the particles of the powdered and/or granulated carbon material C fed from the upstream side be uniformly placed in the magnetic field formed by the magnetic roll. From this point of view, it is desirable to feed the carbon material from an approximately tangential direction to the magnetic roll 130, as shown in the embodiment in FIG. 1, so that the particles of the powdered and/or granulated carbon material C flow uniformly as a thin fluidized layer toward the magnetic roll.

In order to improve the efficiency of magnetic separation, it is desirable that when the particles of powder and/or granule of carbon material are fed from the upstream supply path to the surface of the magnetic roll or the area near the magnetic roll, it is preferable that they move in time to be sufficiently influenced by the magnetic field formed by the magnetic roll. From this point of view, for example, the particles of powder and/or granule of carbon material as a whole flow almost in parallel, albeit temporarily, with the surface of the rotating magnetic roll. In other words, the particles of powder and/or granule can be made to flow in such a way that they maintain a relatively stationary positional relationship with the surface of the rotating magnetic roll. The supply path is not limited to such a belt conveyor or other driven conveyance means, but can take any other form as long as it is capable of quantitative supply to the magnetic roll. For example, a slider with an inclined surface or a vibrating conveyor can be used.

The magnetic roll are not particularly limited as long as they can reliably capture the metallic component on their surface while rotating. For example, they can utilize any permanent magnet element or electromagnetic element. In addition, the magnetic roll may be a solid magnet element that is magnetized in the entire circumferential direction, such as magnet rods, but considering the work of removing the metallic component attached to the magnetic roll from the magnetic roll again after separating them from the carbon material, it is preferable from the standpoint of operability that only a certain area in the circumferential direction of the magnetic roll is magnetized. Specifically, as shown in FIG. 1, the magnetic roll is composed of a rotating hollow cylindrical element 132 whose surface is the contact surface with the carbon material, and a magnet element 134 having an arc-shaped magnetized facing surface disposed in close proximity to the inner surface of the hollow cylindrical element in the inner space of the hollow cylindrical element. In the magnetic roll 134 of this embodiment, in the region where the magnet element 134 exists, the metallic component M attaches itself to the surface of the hollow cylindrical element 132 which is located above the magnet element 134 by the magnetic force of the magnet element 134, and moves in the circumferential direction with the rotation of the hollow cylindrical element 132 while the metallic component M remaining to the surface of the hollow cylindrical element 132. As the rotation of the hollow cylindrical element 132 progresses and reaches a region where the magnet element 134 does not exist inside, the magnetic force disappears and the metallic component M naturally separates from the surface of the hollow cylindrical element 132, thereby enabling separate collection of the metallic component.

As the magnetization mode of the magnet element that constitutes the magnetic roll 130 used in the first magnetic separation step, for example, a plurality of magnets arranged in a row with different magnetic poles alternating at intervals in the circumferential direction and magnetized in the circumferential direction may be used. However, to magnetize in the radial direction with different poles for the center side and the periphery side is simpler in terms of configuration and provides good characteristics.

The magnetic force of the magnetic roll used in the first magnetic separation step is not particularly limited, since it depends on the type of carbon material to be treated, the structure of the magnetic roll, and the like. However, in the case of permanent magnets, for example, a permanent magnet having a magnetic force of 5,000 to 20,000 gauss, more preferably 8,000 to 20,000 gauss, and even more preferably 10,000 to 20,000 gauss may be desirably used. For example, if a higher magnetic force is to be used, an electromagnet can be used instead of a permanent magnet, taking safety into consideration.

As mentioned above, in the method for producing carbon material dispersion according to the first aspect of the present invention, the carbon material is dryly applied to the magnetic roll in the first magnetic separation step. In addition to the magnetic roll, it is also possible to use other types of magnetic separators before and/or after the magnetic roll. For example, a lattice magnet element as described above, a magnet element suspended from the upper side of the supply path, a magnet element placed on the left and/or right side of the supply path, etc., or a "multi-stage weak magnetic separator" that can simultaneously sort multiple components of magnetic materials according to differences in their magnetic susceptibility by generating multiple different uniform magnetic fields and that may be expanded from a single stage to any number of stages by combining one or more conveyors with one or more weak magnetic separating units, may be used.

Incidentally, it is possible to consider the use of other forms of magnetic separators, such as multi-stage weak magnetic separator, instead of the magnetic roll of the present invention as the first magnetic separation step in the dry process, and to combine them with the second magnetic separation step in the wet process as described below, as a precondition for the present invention.

(Dispersion Preparation Step)

In the method for producing a carbon material dispersion according to the first aspect of the present invention, the carbon material sorted by removing metallic components in the first magnetic separation step as described above is then dispersed in a dispersing medium to prepare a carbon material dispersion. The preparation step of the carbon material dispersion may be carried out as a continuous process in which the sorted carbon material obtained in the first magnetic separation step and the dispersing medium to be added are sequentially supplied, or it may be carried out as a batch process in which the sorted carbon material obtained in the first magnetic separation step is mixed with the dispersing medium when the sorted carbon material reaches a predetermined amount.

For example, the embodiment shown in FIG. 1 is an embodiment in which the dispersion preparation apparatus 200 that performs this dispersion preparation step is configured as a batch type. In FIG. 1, the magnetically sorted carbon material C collected in the carbon material recovery section 140 by magnetic sorting in the dry refining apparatus 100 is transferred from the recovery section 140 to the stirring vessel 220 of the dispersion preparation apparatus 200 in predetermined quantities, and a predetermined amount of dispersing medium and other additives are added as necessary. After the dispersion D is prepared, the open/close valve 230 provided at the bottom of the stirring vessel 220 is opened to introduce the dispersion D into the flow channel 320 of the wet refining apparatus 300 where the second magnetic separation step is performed.

On the other hand, if the carbon material C collected in the carbon material recovery section 140 of the dry refining apparatus 100 and the dispersing medium are each continuously supplied in a certain amount to the dispersion preparation apparatus, while the dispersing process is completed within the time it takes to pass through the flow path in the dispersion preparation apparatus, and the dispersion D prepared continuously according to the amount supplied is continuously supplied in a certain amount to the wet refining apparatus where the second magnetic separation step is conducted, the preparation step of the carbon material dispersion can be carried out as the continuous process.

The dispersing medium used is not particularly limited and can be selected according to the purpose of use of the carbon material dispersion obtained by the producing method of the present invention. Any kind of dispersing medium including water and various organic solvents may be used.

For example, when the carbon material dispersion obtained by the producing method of the present invention is used for lithium-ion secondary battery applications, it is desirable to use an organic solvent.

Although the organic solvent is not limited to any medium as far as the medium can be removed by drying, specifically, as the organic solvent, for example, dibutyl ether; ester solvents such as ethyl acetate, ethyl propionate, propyl propionate, butyl propionate, pentyl propionate, hexyl propionate, heptyl propionate, octyl propionate, ethyl butyrate, propyl butyrate, butyl butyrate, pentyl butyrate, hexyl butyrate, heptyl butyrate, octyl butyrate, ethyl valerate, propyl valerate, butyl valerate, amyl valerate, hexyl valerate, heptyl valerate, octyl valerate, ethyl caproate, propyl caproate, butyl caproate, pentyl caproate, hexyl caproate, heptyl caproate, octyl caproate, ethyl heptanoate, propyl heptanoate, butyl heptanoate, pentyl heptanoate, hexyl heptanoate, heptyl heptanoate, octyl heptanoate, etc.; ketone solvents such as methyl ethyl ketone (MEK), methyl isobutyl ketone (MIBK), cyclohexanone (anon); non-protic polar solvents such as N,N-dimethylformamide (DMF), N,N-dimethylacetamide (DMAc), N-methyl-2-pyrrolidone (NMP), etc.; alkane solvents such as pentane, cyclopentane, hexane, cyclohexane, heptane, cycloheptane, octane, cyclooctane, nonane, decane, etc.; chain carbonates such as dimethyl carbonate, ethyl methyl carbonate, diethyl carbonate, etc.; cyclic carbonates such as ethylene carbonate, propylene carbonate, etc.; toluene, xylene, benzene, mesitylene, paraffin, carbon tetrachloride, etc., are exemplified. These can be used singly or in combination of any two or more members.

The carbon material dispersion to be prepared may include, for example, any dispersant to improve the dispersibility of the carbon material powder and/or granule in the above dispersing medium, any binder, and any other additives as long as they do not interfere with the processing in the second magnetic separation step described below. It is naturally possible for these components to be blended into the carbon material dispersion after processing in the second magnetic separation step described below. For example, in the case of all-solid electrolyte lithium secondary battery applications, these components or solid electrolytes, cathode active material or anode active material, etc. can be blended into the carbon material dispersion after processing in the second magnetic separation step described below.

The stirring treatment in preparing the carbon material dispersion is not particularly limited, and can be performed using any of media mills such as bead mills, media-less mills such as dispersers and homogenizers, homomixers for dispersion equipped with dispersing and shearing blades, ultrasonic agitators, static agitators with a flow channel structure, etc., in addition to the stirrer 210 having a mechanical agitation mechanism as shown schematically in FIG. 1.

The viscosity of the carbon material dispersion prepared in this way is not particularly limited, but in order to ensure good migration of the metallic components present in the dispersing medium in the second magnetic separation step described below, for example, it is desirable that the viscosity under 25° C. conditions is in a range of about 10 to about 1000 mPa's, preferably, in a range of about 10 to about 500 mPa's, and more preferably, in a range of about 10 to about 200 mPa's.

As for the content of carbon materials in the carbon material dispersion, it depends on the type of solvent used as the dispersing medium, but it is desirable that, for example, the content of the carbon material in the dispersing medium is in a range of about 10 to about 25% by mass based on a total mass of the carbon material dispersion.

(Second Magnetic Separation Step)

In the producing method for carbon material dispersion of the present invention, after the dispersion preparation step as described above, a second magnetic separation step in which a magnet element is placed in the obtained carbon material dispersion to remove metallic components from the carbon material dispersion is provided.

In the producing method of the carbon material dispersion of the present invention, as described above, the carbon material is subjected to the first magnetic separation step in the dry state to remove the metallic components, so there may be cases where there are no metallic components in the carbon material dispersion. However, for example, there may be other cases where there is a very small number of metallic components which were incorporated in the particles of the powder and/or granular carbon material, or which were agglomerated with the carbon material in the dry state, and thus were not easily captured by the magnet in the dry state. Therefore, applying another magnet element in the wet state for the second time can result in a higher removal rate of the metal components.

The second magnetic separation step can be carried out by placing the magnet element in the carbon material dispersion, so it can be a continuous process by placing the magnet element in the flow path of the carbon material dispersion, or it can be a batch process by placing the magnet element in the liquid vessel containing the carbon material dispersion, for example.

As the magnet element used in the second magnetic separation step, for example, any permanent magnet element or any electromagnet element may be used as long as it is capable of reliably capturing metallic components on its surface in the carbon material dispersion. Since the second magnetic separation step undergoes in the wet condition, however, in the case of an electromagnet element, a waterproof or drip-proof structure is at least required, so it is preferable to use a permanent magnet element.

In addition, in the embodiment of continuous processing of carbon material dispersion, the magnet element can be composed of a magnet element 310 that occupies a part of the axial-vertical cross section of the flow path 320 for the carbon material dispersion and is arranged approximately along the axial direction of the flow path, as in the embodiment shown in FIG. 1, thereby forming a liquid flow channel, such as a grid or slit, in contact with the surface of the magnet element 310 (such a magnet element is hereinafter also referred to as a "magnetic filter"). The sectional area, shape, etc. of the lattice-like or slit-like liquid flow channel of the magnetic filter is not particularly limited, and can be selected appropriately according to the magnetic strength of the magnet element, the concentration of the carbon material dispersion, etc. For example, in the example shown in FIG. 1, the liquid flow channel are formed in several sections, including the outer periphery and the center of the flow path 320, but by coaxially distributing a columnar magnet element 310 inside a section of the cylindrical flow path 320, a continuous slit along the periphery of the flow path 320 can be also formed. The magnetic filter can be used, for example, as a magnetic filter. In addition, the magnetic filter may have, for example, a magnetizing yoke, and the magnet itself does not come into direct contact with the carbon material dispersion, but the magnetic surface of the magnetizing yoke or other magnetic material applied by the magnetic field of the magnet comes into contact with the carbon material dispersion. Thereby, it is possible that the magnetic metal in the carbon material dispersion is captured on the magnetic surface of the magnetized yoke.

The magnetic force of the magnet element used in the second magnetic separation step is not particularly limited since it depends on the type of carbon material to be processed, the concentration of the carbon material dispersion, etc. For example, as the permanent magnet, it is desirable that the magnetic force is equivalent to 5,000 to 20,000 gauss, more preferably 10,000 to 20,000 gauss, and more preferably 15,000 to 20,000 gauss. As in the first magnetic separation step, electromagnets can also be used, for example, to set a higher magnetic force, taking safety into consideration. In this case, a waterproof or drip-proof structure must be provided for the electromagnet as described above by using a suitable protective tube.

Thus, in the method for producing carbon material dispersion according to the first aspect of the present invention, the first magnetic separation step under dry conditions and the second magnetic separation step under wet conditions are carried out, so that the carbon material dispersion finally obtained can be of high quality with a very low content of metallic components. In the method for producing carbon material dispersion according to the first aspect of the present invention, it is possible to optionally add processes such as, for example, a redispersion process, a dilution process, and an additive addition process, following the second magnetic separation step, in order to make the resulting carbon material dispersion have a composition according to the intended use.

Carbon Material Dispersion

The carbon material dispersion according to the second aspect of the present invention is a carbon material dispersion in which carbon material is dispersed in a dispersing medium, the content of the carbon material in the dispersing medium is in a range of 10-25% by mass based on the total mass of the carbon material dispersion, and a mass fraction of a magnetic metallic component to the carbon material is not more than $1 \times 10^{-7}$. In addition, the dispersing medium is an organic solvent.

By implementing the method for producing carbon material dispersion according to the first aspect of the present invention as described above, it is possible to manufacture a high-quality carbon material dispersion with a very low content of metallic components. When the carbon material content in the dispersion is about 10-25% by mass based on the total mass of the carbon material dispersion, it is possible to produce a carbon material dispersion in which the mass fraction of a magnetic metallic component to the carbon material is not more than $1 \times 10^{-7}$, preferably, not more than $5 \times 10^{-8}$ or less, and more preferably, not more than $3 \times 10^{-8}$. In the carbon material dispersion according to the second aspect of the present invention, the "carbon material" is the same as that defined in the method for producing the carbon material dispersion according to the first aspect of the present invention described above. The "organic solvent" is also not particularly limited, and the same as those described above can be exemplified. Furthermore, the carbon material dispersion can include, for example, dispersants, binder components, and other additives to improve the dispersibility of the powder and/or granule carbon material in the above dispersing medium.

<Refining Apparatus for Carbon Material>

The carbon material refining apparatus according to the third aspect of the present invention is an apparatus that is suitably used in the above-mentioned first magnetic separation step, i.e., in implementing magnetic separation under dry conditions, in the producing method for carbon material dispersion according to the first aspect as described above.

In other words, the carbon material refining apparatus (dry refining apparatus 100) according to the third aspect of the present invention comprises: a magnetic roll 130 which comprises a rotating hollow cylindrical element 132, the surface of which comprises a contact surface with the carbon material C, and the magnet element 134 which comprises an arc-shaped magnetized facing surface arranged in close proximity to the inner surface of the hollow cylindrical element in an inner space of the hollow cylindrical element; a supply path 120 located upstream of the rotating hollow cylindrical element of the magnetic roll, which supplies the powder and/or granule carbon material C to the rotating hollow cylindrical element 132 of the magnetic roll; and a carbon material recovery section 140 located downstream of the rotating hollow cylindrical element 132 of the magnetic roll, which collects the particles of powder and/or granule carbon material C which fall down without attaching themself to the surface of the hollow cylindrical element, as shown schematically in FIG. 1.

In the embodiment shown in FIG. 1, the magnet element 134 itself has a semi-circular sectional shape and is entirely magnetized. The same function can be achieved by using a magnet element that the element itself is cylindrical (i.e., circular in section), and only a certain angular range of the cylindrical body is magnetized, while the rest of the angular range is non-magnetic.

The magnet element 134 is inside the rotating hollow cylinder 132 and magnetically attracts and retains the metallic component on the surface of the hollow cylinder 132 within a certain angular range, i.e., within the angular range having an arc-shaped magnetized facing surface, and loses the magnetic force beyond the angular range to desorb the metallic component retained on the surface of the hollow cylinder 132. The process length (angular range) in which the metallic component is held by magnetic attraction is not particularly limited, as long as the falling trajectory of the particles of the powder and/or granule carbon material C (the sorted carbon material without metallic component) that leaves the magnetic roll without attaching themselves to the magnetic roll 130 when applied to the magnetic roll 130 is sufficiently distanced from the separated metallic component. However, it is desirable that the angle range of the magnetized facing surface is, for example, about 90° to 270°.

Furthermore, as in the embodiment shown in FIG. 1, when the supply position for feeding the powdered and granulated carbon material C to the magnetic roll 130 is near the topmost position of the magnetic roll 130 and the direction of rotation of the magnetic roll is in the forward direction with the supply direction of the carbon material, and when the topmost position of the magnetic roll 130 is set to 0°, it is preferable for separating and recovering the carbon material C and the metallic component M that the arc-shaped magnetized facing surface of the magnet element 134 starts at a position of −20° to 30° in the forward direction to the direction of rotation of the hollow cylindrical element and does not exist at a position of at least 275° to 315°.

In the dry refining apparatus 100 of the present invention, as for the magnetization form of the magnet element 134 which constitutes the magnetic roll 130, as described above, it is possible to use the form where a plurality of magnets arranged in a row with different magnetic poles alternating at intervals in the circumferential direction and magnetized in the circumferential direction may be used. However, it is preferable to magnetize in the radial direction with different poles for the center side and the periphery side, since configuration becomes simpler and it provides good characteristics.

As for the magnetic force of the magnet element part 134 that constitutes the magnetic roll 130, as mentioned above, it is not particularly limited, but for example, a permanent magnet having a magnetic force of 5,000 to 20,000 gauss, more preferably 8,000 to 20,000 gauss, and even more preferably 10,000 to 20,000 gauss may be desirably used.

The hollow cylindrical element 132, which is the rotating portion of the magnetic roll 130, and the magnet element 134, which is the stationary fixed portion, are usually arranged coaxially, but for example, by installing a known rolling bearing or sliding bearing mechanism between the rotating shaft of the former and the support shaft of the latter, the rotating portion and the stationary portion can be easily supported and configured coaxially.

In the dry refining apparatus 100 of the present invention, with respect to the direction of rotation of the magnetic roll, as described above, it is possible to use the magnetic roll 130 that rotates in the forward direction with the conveying direction of the carbon material in the upstream supply path 120 as shown in FIG. 1, FIG. 3A, and FIG. 4A, or use the magnetic roll 130 that rotates in the reverse direction with the conveying direction as shown in FIG. 2, FIG. 3B, and FIG. 4B. However, it is desirable to use the magnetic roll 130 that rotates in the forward direction with the conveying direction.

In addition, in the dry refining apparatus 100 of the present invention, with respect to the feeding position where the powdered and/or granulated carbon material C is fed to the magnetic roll 130 is not particularly limited as described above. For example, the position can be near the topmost position of the magnetic roll 130 as shown in FIGS. 1 and 2, near the bottommost position of the magnetic roll 130 as shown in FIGS. 3A and 3B, or at any intermediate position between the top and bottom of the magnetic roll 130 as shown in FIGS. 4A and 4B. Among these, it is desirable to set the position near the topmost position of the magnetic roll 130 as shown in FIG. 1 in order to make relations between any two among the supplying direction of the carbon material C, the flow of the carbon material C sorted by the magnetic roll, and the separated metallic component M better without interfering with each other.

As described above, with respect to the supply path 120 for the carbon material, it is desirable to feed the carbon material from an approximately tangential direction to the magnetic roll 130, as shown in the embodiment in FIG. 1, so that the particles of the powdered and/or granulated carbon material C flow uniformly as a thin fluidized layer toward the magnetic roll.

The supply path 120 is not limited to such a belt conveyor as in the embodiment shown in FIG. 1 or other driven conveyance means, but can take any other form as long as it is capable of quantitative supply to the magnetic roll. For example, a slider with an inclined surface or a vibrating conveyor can be used.

In the embodiment shown in FIG. 1, the upper position of the upstream end of the supply path 120 for the carbon material is provided with a supply hopper or other supply device 110 that supplies carbon material to make the supply of the carbon material to the magnetic roll 130 more uniform and stable.

In addition, not only the supply hopper, but also any regulator that regulates the amount of powder and/or granule supplied, such as slit nozzles, weir structures, etc., can be installed to uniformly supply the powder and/or granule of the carbon material C as a layer of a predetermined thickness or less to the surface of the magnetic roll.

In addition, in the embodiment shown in FIG. 1, a metallic component recovery section 150 is provided downstream of the hollow cylindrical element 132, separately from the carbon material recovery section 140 that recovers the powder and/or granule of the carbon material C described above. The metallic component recovery section 150 may be located at a position where the metallic component M, once attached to the hollow cylindrical element 132 and separated from the carbon material, can be recovered when the metallic component M reaches an angle not covered by the magnetic force of the magnet element 134 due to the rotation of the hollow cylindrical element 132 and falls away from the surface of the hollow cylindrical element 132.

In the embodiment shown in FIG. 1, at the downstream side of the hollow cylindrical element 132 in which the magnetic roll 130 rotates, a separation adjustment blade 160 with a changeable inclination angle is provided at an upper position in an approximately tangential direction to the hollow cylindrical element 132 and near the boundary between the carbon material recovery section 140 and the metallic component recovery section 150. By adjusting the inclination angle of the separation adjustment blade 160, it is possible to adjust to some extent the ratio of the powder and/or granule falling into the carbon material recovery section 140 and the metallic component recovery section 150, thereby enabling fine adjustment between the removal rate of the metallic component and the yield of the recovered carbon material.

<Refining System for Carbon Material>

The refining system for carbon materials according to the fourth aspect of the present invention is a system that may be used in implementing the method for producing carbon material dispersion according to the first aspect as described above.

FIG. 1 is a block diagram schematically showing the overall configuration of an embodiment of a carbon material refining system used in implementing the method for producing carbon material dispersion according to the first aspect of the present invention, as described above.

As shown in FIG. 1, the carbon material refining system according to the fourth aspect of the present invention comprises an upstream-side dry refining apparatus 100 and a downstream-side wet refining apparatus 300. The dry refining apparatus comprises a magnetic roll 130 and a recovery section 140, wherein the magnetic roll 130 comprises a rotating hollow cylindrical element 132, and a magnet element 134. The surface of the rotating hollow cylindrical element 132 comprises a contact surface with a carbon material, and the magnet element 134 comprises an arc-shaped magnetized facing surface arranged in close proximity to an inner surface of the hollow cylindrical element in an inner space of the hollow cylindrical element. The recovery section 140 is located downstream of the rotating hollow cylindrical element 132 of the magnetic roll 130, and the recovery section 140 collects the carbon material in powdered and/or granulated form which falls down without attaching itself to the surface of the hollow cylindrical element.

The wet refining apparatus 300 comprises a magnetic filter, The magnetic filter comprises a magnet element 310 arranged in a flow path 320 of a carbon material dispersion D approximately along an axial direction of the flow path, so as to form a liquid flow path, such as the lattice-like or slit-like passageway, in contact with a surface of the magnet element or a magnetic surface applied by a magnetic field of the magnet element. Incidentally, the carbon material dispersion D is prepared by dispersing the carbon material in powdered and/or granulated form, which has been applied to the dry refining apparatus 100 and collected in the recovery section 140 of the dry refining apparatus, in a dispersing medium.

In the refining system for carbon materials according to the fourth aspect of the invention, the upstream-side dry refining apparatus 100 and the downstream-side wet refining apparatus 300 can be configured for continuous processing, including a dispersion preparation apparatus 200 provided between the two apparatuses 100 and 300, or they can be configured for batch processing.

The configuration of the upstream-side dry refining apparatus 100 and the downstream-side wet refining apparatus 300 are as described in detail above, and are therefore omitted here to avoid duplication.

EXAMPLE

Next, the present invention will be described in more detail by way of examples.

Example 1

A carbon material refining system with the configuration shown in FIG. 1 was used to produce carbon material dispersion.

First, 10 kg of acetylene black (Denka Black (trademark), granular product, manufactured by Denka Corporation, Japan) was supplied from a hopper 110 in the dry refining apparatus 100 shown in FIG. 1, and transported by a belt conveyor 120. It was fed at a feeding rate of about 100 kg/hour in a thin layer uniformly in the width direction to a magnetic roll 130 of 300 mm in width×300 mm in diameter rotating at a peripheral speed of 40 rpm. The magnetic roll 130 was equipped with a semicircular (180 degrees arc) 8,000 gauss permanent magnet element 134 that was magnetized in the radial direction of the magnetic roll.

The acetylene black that was dry sorted by the magnetic roll and collected was then added to N-methyl-2-pyrrolidone (NMP) as a dispersing medium and dispersed by using a bead mill to prepare the acetylene black dispersion. The amount of acetylene black contained in the total mass of the dispersion was 20% by mass, and the viscosity of the dispersion was 200 mPa's at 25° C.

The acetylene black dispersion prepared in this way was fed at a feed rate of about 10 L/min into the flow path 320 of the wet refining apparatus 300 of the system shown in FIG. 1, and passed through a magnetic filter with an annular slit-shaped passage (slit width: 1.3 cm) formed by depositing a columnar 18,000 gauss permanent magnet 310 in a cylindrical flow channel in order to proceed the wet sorting treatment.

In order to investigate the concentration of Fe in the finally obtained acetylene black dispersion, the acetylene black dispersion was first weighed, and after evaporating the dispersing medium of NMP and drying, nitric acid was added to the residuum and heated to decompose it. Then, the acetylene black and the acid decomposition solution were separated by filter paper, and the separated acid decomposition solution was measured by high-frequency inductively coupled plasma atomic emission spectrometry (ICP-AES) (instrument name: SPECTRO ACROS MV130 FHM22, manufactured by Spectro). As a result, the Fe concentration in the obtained acetylene black dispersion was determined as $4\times10^{-8}$ in mass fraction to the carbon material, and it was found that a highly purified acetylene black dispersion with extremely reduced metallic component content was obtained. In addition, the yield of acetylene black in the obtained acetylene black dispersion was 99.3%, and the amount of acetylene black lost during the purification process was found to be small.

Comparative Example 1

Acetylene black, the material to be treated in Example 1, was directly added to NMP as the dispersing medium, and dispersed by using a bead mill to prepare an acetylene black dispersion of 20% by mass. The concentration of Fe in the acetylene black dispersion was measured in the same way as in Example 1, and the concentration was found to be $8.3\times10^{-7}$ in mass fraction to the carbon material.

Comparative Example 2

The acetylene black dispersion was obtained in the same manner as in Example 1, except that the dry magnetic separation step was omitted. In other words, commercially available acetylene black was added to NMP as a dispersing medium and dispersed by using a bead mill to prepare an acetylene black dispersion with a concentration of 20% by mass. The acetylene black dispersion was fed at a feed rate of about 10 L/min into the flow path 320 of the wet refining apparatus 300 of the system shown in FIG. 1, and passed through a magnetic filter (slit width 1.3 cm) composed of a 18,000 gauss permanent magnet 310 to perform the wet sorting treatment. The concentration of Fe in the acetylene black dispersion was measured in the same way as in Example 1, and the concentration was found to be $2.5\times10^{-7}$ in mass fraction to the carbon material.

Referential Example 1

The acetylene black dispersion was obtained in the same manner as in Example 1, except that the wet magnetic separation step was omitted. The acetylene black that was dry sorted by the magnetic roll and collected was then added to N-methyl-2-pyrrolidone (NMP) as a dispersing medium and dispersed by using a bead mill to prepare the acetylene black dispersion of a concentration of 20% by mass. The concentration of Fe in this acetylene black dispersion was directly measured in the same manner as in Example 1, and was found to be $1.3\times10^{-7}$ in mass fraction of carbon material.

Referential Example 2

In Example 1, a lattice-shaped magnetic filter (two-stage system, 32 cm in width, 30 cm in length, six magnets in the first stage and five magnets in the second stage) composed of 8,000 gauss permanent magnets was used in place of the dry refining apparatus. 10 kg of commercially available acetylene black, the same as that used in Example 1, was dryly applied to the lattice-shaped magnetic filter in the same feeding rate as in Example 1. This treatment resulted in a certain amount of acetylene black particles adhering to the surface of the magnet filter.

Thereafter, with respect to the acetylene black after this dry treatment with the lattice magnetic filter, according to the same manner as in Example 1, it was added to NMP, and dispersed by using the bead mill to prepare an acetylene black dispersion with a concentration of 20% by mass. The acetylene black dispersion was then fed into the flow path 320 of the wet refining apparatus 300 of the system shown in FIG. 1 at a feed rate of 10 L/min, and passed through a magnetic filter (slit width 1.3 cm) composed of a 18,000 gauss permanent magnet 310 to perform the wet sorting treatment. The concentration of Fe in the acetylene black dispersion was measured in the same way as in Example 1, and the concentration was found to be $1.2\times10^{-7}$ in mass fraction to the carbon material.

Examples 2 to 5

The same procedure as in Example 1 was carried out, except that instead of the 8,000 gauss permanent magnet element 134 of the magnetic roll 130 in the dry refining apparatus 100, permanent magnets 134 of 3,000 gauss, 5,000 gauss, 10,000 gauss, and 15,000 gauss were used, respectively.

The concentrations of Fe in the finally obtained acetylene black dispersions were measured in the same way as in Example 1, and the concentrations were found to be $1\times10^{-7}$, $8\times10^{-8}$, $3\times10^{-8}$, and $2\times10^{-8}$, respectively, in mass fraction to the carbon material. The acetylene black dispersions with reduced metallic component content were obtained in all cases. In particular, regarding Examples 4 and 5, acetylene black dispersions with a degree of purification better than that of Example 1 were obtained. The yields of acetylene black in the obtained acetylene black dispersion were 99.8%, 99.5%, 99.2%, and 99.1%, respectively, and thus the amount of acetylene black lost in the refining process was found to be small.

Examples 6 to 9

The same procedure as in Example 1 was carried out, except that instead of a magnetic filter composed of a permanent magnet 310 of 18,000 gauss in the wet refining apparatus 300, magnetic filters composed of permanent magnets 310 of 5,000 gauss, 10,000 gauss, and 13,000 gauss were used, respectively.

The concentrations of Fe in the finally obtained acetylene black dispersions were measured in the same way as in Example 1, and the concentrations were found to be $9\times10^{-8}$, $6\times10^{-8}$, and $5\times10^{-8}$, respectively, in mass fraction to the carbon material. The acetylene black dispersions with reduced metallic component content were obtained in all cases. The yields of acetylene black in the obtained acetylene black dispersions were 99.4%, 99.4%, and 99.3%, respectively, and thus the amount of acetylene black lost in the refining process was found to be small.

The average particle size, viscosity of the dispersion, metallic component content in the dispersion, and acetylene black (carbon black) yield in the dispersion shown in the above examples, comparative examples, and referential examples were measured according to the following criteria.

(Average Particle Size)

The average particle diameter D50 (median diameter meaning the particle diameter at 50% of the integrated value in the particle size distribution determined by the laser diffraction scattering method) obtained by measuring the particle size distribution using a laser diffraction scattering particle size analyzer (LA-960, manufactured by Horiba, Ltd.).

(Viscosity of the Dispersion)

The values were obtained by measuring with a B-type viscometer (TVB-15, manufactured by Toki Sangyo Co., Ltd.) at a temperature of 25° C. (rotor No. 21, 60 rpm).

(Metallic Component (Fe) Content in Dispersion)

To investigate the concentration of Fe in the acetylene black dispersion, first weigh the acetylene black dispersion, evaporate the NMP, which is the dispersing medium, and dry the dispersion, and then pre-treat the residuum by adding nitric acid and heating to decompose it. The acetylene black and the acid decomposition solution were then separated by filter paper, and the separated acid decomposition solution was measured by high-frequency inductively coupled plasma atomic emission spectrometry (ICP-AES) (instrument name: SPECTRO ACROS MV130 FHM22, manufactured by Spectro).

(Yield)

The yield of acetylene black (carbon black) in the dispersion was calculated by comparing the mass of acetylene black in a dispersion of interest, with the mass of acetylene black in the dispersion when the acetylene black to be treated was dispersed in the dispersing medium without undergoing magnetic sorting (Comparative Example 1), which was set to be the mass of 100% yield.

EXPLANATION OF SIGN 100 dry refining apparatus
120 supply path
130 magnetic roll
132 hollow cylindrical element
134 magnet element
140 carbon material recovery section
150 metallic component recovery section
160 separation adjustment blade
200 dispersion preparation apparatus
210 stirrer
220 stirring vessel
230 opening and closing valve
300 wet refining apparatus
310 magnet element (magnetic filter)
320 flow path
C carbon material
M metallic component
D carbon material dispersion It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims. The content of all references referred to herein are incorporated herein by reference in their entirety.

What is claimed is:

1. A method for producing carbon material dispersion comprising a first magnetic separation and a second magnetic separation;
the first magnetic separation comprising applying a carbon material to a surface of a rotating magnetic roll in order to remove a metallic component from the carbon material, the carbon material being in dry state and being in powdered and/or granulated form;
the second magnetic separation comprising placing a magnet element in a carbon material dispersion in order to remove the metallic component from the carbon material dispersion; and
the carbon material dispersion being prepared by dispersing the carbon material from which the metallic component has been removed in the first magnetic separation in a dispersing medium, in advance of the second magnetic separation.

2. The method for producing carbon material dispersion according to claim 1, wherein the magnetic roll used in the first magnetic separation rotates in a forward direction with a conveying direction of the carbon material in powdered and/or granulated form.

3. The method for producing carbon material dispersion according to claim 1, wherein the magnetic roll used in the first magnetic separation has a magnet element of 5000 to 20000 gauss that is magnetized in a radial direction of the magnetic roll, and the magnet element used in the second magnetic separation is a magnet element of 5000 to 20000 gauss that is arranged in a flow path of the carbon material dispersion approximately along an axial direction of the flow path.

4. The method for producing carbon material dispersion according to claim 1, wherein a viscosity of the carbon material dispersion subjected to the second magnetic separation is in a range of 10 to 1000 mPa's.

5. The method for producing carbon material dispersion according to claim 1, wherein the dispersing medium is an organic solvent.

6. A carbon material refining apparatus comprising:
a magnetic roll comprising a rotating hollow cylindrical element, and a magnet element, a surface of the rotating hollow cylindrical element being a contact surface with a carbon material, the magnet element comprising an arc-shaped magnetized facing surface arranged in close proximity to an inner surface of the hollow cylindrical element in an inner space of the hollow cylindrical element;
a supply path located upstream of the rotating hollow cylindrical element of the magnetic roll, the supply path supplying the carbon material in powdered and/or granulated form; and
a recovery section located downstream of the rotating hollow cylindrical element of the magnetic roll, the recovery section collecting the carbon material in powdered and/or granulated form which falls down without attaching itself to the surface of the hollow cylindrical element,
wherein the supply path comprises a belt conveyor section which has a terminal portion near a topmost position of the magnetic roll and which conveys the carbon material in powdered and/or granulated form in an approximately tangential direction directly from the belt conveyor section to the magnetic roll.

7. The carbon material refining apparatus according to claim 6, wherein the apparatus further comprises a regulator which regulates an amount of the carbon material in powdered and/or granulated form fed to the hollow cylindrical element of the magnetic roll in order to feed the carbon material conveyed on the belt conveyor section as a layer of predetermined thickness or less.

8. The carbon material refining apparatus according to claim 6, wherein the arc-shaped magnetized facing surface of the magnet element has an angular range of 90° to 270°.

9. The carbon material refining apparatus according to claim 6, wherein the arc-shaped magnetized facing surface of the magnet element starts at a position of −20° to 30° in the forward direction of rotation of the hollow cylindrical element and does not exist at a position of at least 275° to 315°, on an assumption that a topmost position of the magnetic roll is set to 0°.

10. The carbon material refining apparatus according to claim 6, wherein the magnet element is of 5000 to 20000 gauss and is magnetized in a radial direction of the magnetic roll.

11. A carbon material refining system comprising:
- an upstream-side dry refining apparatus and a downstream-side wet refining apparatus;
- the dry refining apparatus comprising a magnetic roll and a recovery section,
- the magnetic roll comprising a rotating hollow cylindrical element, and a magnet element, a surface of the rotating hollow cylindrical element being a contact surface with a carbon material, the magnet element comprising an arc-shaped magnetized facing surface arranged in close proximity to an inner surface of the hollow cylindrical element in an inner space of the hollow cylindrical element,
- the recovery section located downstream of the rotating hollow cylindrical element of the magnetic roll, the recovery section collecting the carbon material in powdered and/or granulated form which falls down without attaching itself to the surface of the hollow cylindrical element; and
- the wet refining apparatus comprising a magnetic filter,
- the magnetic filter comprising a magnet element arranged in a flow path of a carbon material dispersion approximately along an axial direction of the flow path, and a liquid flow passage in contact with a surface of the magnet element or a magnetic surface applied by a magnetic field of the magnet element, the carbon material dispersion passing through the liquid flow passage, with a proviso that the carbon material dispersion is prepared by dispersing the carbon material in powdered and/or granulated form, which has been applied to the dry refining apparatus and collected in the recovery section of the dry refining apparatus, in a dispersing medium.

* * * * *

UNITED STATES PATENT AND TRADEMARK OFFICE
CERTIFICATE OF CORRECTION

PATENT NO. : 12,076,730 B2
APPLICATION NO. : 17/345373
DATED : September 3, 2024
INVENTOR(S) : M. Nakajo et al.

Page 1 of 1

It is certified that error appears in the above-identified patent and that said Letters Patent is hereby corrected as shown below:

In the Claims

Column 22, Line 22 (Claim 4, Line 4) please change "mPa's" to -- mPa·s --

Signed and Sealed this
Fourth Day of March, 2025

Coke Morgan Stewart
*Acting Director of the United States Patent and Trademark Office*